US010277500B2

(12) United States Patent
Medved et al.

(10) Patent No.: US 10,277,500 B2
(45) Date of Patent: *Apr. 30, 2019

(54) APPLICATION-LAYER TRAFFIC OPTIMIZATION SERVICE ENDPOINT TYPE ATTRIBUTE

(71) Applicant: Juniper Networks, Inc., Sunnyvale, CA (US)

(72) Inventors: Jan Medved, Pleasanton, CA (US); Satish Raghunath, Sunnyvale, CA (US); Reinaldo Penno, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 664 days.

This patent is subject to a terminal disclaimer.

(21) Appl. No.: 14/622,514

(22) Filed: Feb. 13, 2015

(65) Prior Publication Data

US 2015/0180762 A1    Jun. 25, 2015

Related U.S. Application Data

(63) Continuation of application No. 12/861,671, filed on Aug. 23, 2010, now Pat. No. 8,959,139.

(Continued)

(51) Int. Cl.
*G06F 15/173* (2006.01)
*H04L 12/755* (2013.01)
(Continued)

(52) U.S. Cl.
CPC .......... *H04L 45/021* (2013.01); *H04L 41/12* (2013.01); *H04L 45/00* (2013.01); *H04L 45/04* (2013.01);
(Continued)

(58) Field of Classification Search
CPC ....... H04L 45/021; H04L 45/00; H04L 45/04; H04L 41/12; H04L 47/10
See application file for complete search history.

(56) References Cited

U.S. PATENT DOCUMENTS

| 6,678,781 B1 | 1/2004 | Doman |
| 7,599,349 B2 | 10/2009 | Vasseur et al. |

(Continued)

FOREIGN PATENT DOCUMENTS

| CN | 101651703 A | 2/2010 |
| EP | 2461547 A1 | 6/2012 |
| WO | 2011054913 A1 | 5/2011 |

OTHER PUBLICATIONS

Alimi et al., "ALTO Protocol," ALTO WG, Internet-Draft, draft-ietf-alto-protocol-03.txt, Mar. 8, 2010, 53 pp.

(Continued)

*Primary Examiner* — Dhairya A Patel
(74) *Attorney, Agent, or Firm* — Shumaker & Sieffert, P.A.

(57) ABSTRACT

Using the ALTO Service, networking applications can request through the ALTO protocol information about the underlying network topology from the ISP or Content Provider. The ALTO Service provides information such as network resource preferences with the goal of modifying network resource consumption patterns while maintaining or improving application performance. This document describes, in one example, an ALTO server that implements enhancements to the ALTO service to assign a PID-type attribute to each of a set of one or more PIDs each associated with a subset of one or more endpoints of a network, wherein a PID-type attribute specifies a type for the subset of endpoints associated with the PID. The ALTO server generates an ALTO network map that includes a PID entry to describe each of the PIDs, wherein each PID entry includes (Continued)

a PID-type field that stores the assigned PID-type attribute for the PID described by the PID entry.

18 Claims, 9 Drawing Sheets

Related U.S. Application Data

(60) Provisional application No. 61/349,467, filed on May 28, 2010.

(51) Int. Cl.
| | | |
|---|---|---|
| *H04L 12/701* | (2013.01) | |
| *H04L 12/715* | (2013.01) | |
| *H04L 29/08* | (2006.01) | |
| *H04L 12/801* | (2013.01) | |
| *H04L 12/24* | (2006.01) | |
| *H04L 29/12* | (2006.01) | |
| *H04L 12/759* | (2013.01) | |

(52) U.S. Cl.
CPC ............ *H04L 47/10* (2013.01); *H04L 67/104* (2013.01); *H04L 67/1021* (2013.01); *H04L 29/12066* (2013.01); *H04L 45/028* (2013.01); *H04L 61/1511* (2013.01)

(56) References Cited

U.S. PATENT DOCUMENTS

| | | | |
|---|---|---|---|
| 7,716,662 B2* | 5/2010 | Seiden ..................... G06F 8/61 | |
| | | | 717/173 |
| 7,978,708 B2 | 7/2011 | Filsfils et al. | |
| 8,179,801 B2 | 5/2012 | Previdi et al. | |
| 8,300,532 B1 | 10/2012 | Venkatramani et al. | |
| 8,423,666 B2 | 4/2013 | Garcia-Luna-Aceves et al. | |
| 8,472,205 B2 | 6/2013 | Gondosch et al. | |
| 8,606,847 B2 | 12/2013 | Raghunath et al. | |
| 8,688,775 B2 | 4/2014 | Penno et al. | |
| 8,700,801 B2 | 4/2014 | Medved et al. | |
| 8,751,613 B1 | 6/2014 | Medved et al. | |
| 8,954,491 B1 | 2/2015 | Medved et al. | |
| 8,959,139 B2 | 2/2015 | Medved et al. | |
| 8,995,285 B2 | 3/2015 | Bajpay et al. | |
| 9,019,865 B2 | 4/2015 | Gredler et al. | |
| 9,325,788 B2 | 4/2016 | Wang et al. | |
| 9,413,847 B2 | 8/2016 | Medved et al. | |
| 10,135,683 B1 | 11/2018 | Medved et al. | |
| 2002/0062310 A1 | 5/2002 | Marmor et al. | |
| 2002/0128768 A1* | 9/2002 | Nakano .................. G01C 21/32 | |
| | | | 701/533 |
| 2003/0179742 A1* | 9/2003 | Ogier .................... H04L 1/1614 | |
| | | | 370/351 |
| 2003/0189919 A1 | 10/2003 | Gupta et al. | |
| 2004/0090913 A1 | 5/2004 | Scudder et al. | |
| 2004/0243503 A1 | 12/2004 | Eng et al. | |
| 2005/0068968 A1 | 3/2005 | Ovadia et al. | |
| 2005/0170845 A1 | 8/2005 | Moran | |
| 2006/0029033 A1 | 2/2006 | Lee | |
| 2006/0039391 A1 | 2/2006 | Vasseur et al. | |
| 2006/0085829 A1* | 4/2006 | Dhodapkar ......... H04N 7/17318 | |
| | | | 725/105 |
| 2006/0153200 A1 | 7/2006 | Filsfils et al. | |
| 2006/0193248 A1 | 8/2006 | Filsfils et al. | |
| 2006/0200579 A1 | 9/2006 | Vasseur et al. | |
| 2006/0291445 A1 | 12/2006 | Martini et al. | |
| 2006/0291446 A1 | 12/2006 | Caldwell et al. | |
| 2007/0050497 A1 | 3/2007 | Haley et al. | |
| 2007/0064702 A1* | 3/2007 | Bates ..................... H04L 45/02 | |
| | | | 370/392 |
| 2007/0124288 A1* | 5/2007 | Swanson ........... G06F 17/30864 | |
| 2007/0260746 A1 | 11/2007 | Mirtorabi et al. | |
| 2007/0280102 A1 | 12/2007 | Vasseur et al. | |
| 2008/0062891 A1 | 3/2008 | Vander Merwe et al. | |
| 2009/0016365 A1 | 1/2009 | Sajassi et al. | |
| 2009/0122718 A1 | 5/2009 | Klessig et al. | |
| 2009/0122724 A1 | 5/2009 | Rosenberg | |
| 2009/0234715 A1 | 9/2009 | Heiser, II et al. | |
| 2010/0161755 A1* | 6/2010 | Li ........................ H04L 67/104 | |
| | | | 709/217 |
| 2010/0208741 A1 | 8/2010 | Vasseur | |
| 2010/0214932 A1 | 8/2010 | Qian et al. | |
| 2010/0235083 A1 | 9/2010 | Takahata et al. | |
| 2010/0278076 A1 | 11/2010 | Reddy et al. | |
| 2010/0293294 A1* | 11/2010 | Hilt ..................... H04L 67/104 | |
| | | | 709/241 |
| 2010/0309841 A1 | 12/2010 | Conte | |
| 2011/0078230 A1* | 3/2011 | Sepulveda ........... H04N 21/222 | |
| | | | 709/203 |
| 2011/0134769 A1 | 6/2011 | Lee et al. | |
| 2011/0138469 A1 | 6/2011 | Ye et al. | |
| 2011/0202651 A1* | 8/2011 | Hilt ..................... H04L 67/1063 | |
| | | | 709/224 |
| 2011/0258257 A1 | 10/2011 | Previdi | |
| 2011/0276718 A1* | 11/2011 | Steiner ................ H04L 45/124 | |
| | | | 709/241 |
| 2011/0295983 A1 | 12/2011 | Medved et al. | |
| 2011/0296053 A1 | 12/2011 | Medved et al. | |
| 2012/0058757 A1 | 3/2012 | Abreu et al. | |
| 2012/0066368 A1 | 3/2012 | Li et al. | |
| 2012/0102223 A1 | 4/2012 | Zhang et al. | |
| 2012/0144066 A1 | 6/2012 | Medved et al. | |
| 2012/0317293 A1* | 12/2012 | Gu ....................... H04L 45/126 | |
| | | | 709/226 |
| 2014/0101254 A1 | 4/2014 | Raghunath et al. | |
| 2014/0215051 A1 | 7/2014 | Schlack et al. | |
| 2014/0215079 A1 | 7/2014 | Penno et al. | |
| 2014/0229581 A1 | 8/2014 | Medved et al. | |
| 2015/0003283 A1 | 1/2015 | Previdi et al. | |
| 2015/0180762 A1 | 6/2015 | Medved et al. | |
| 2015/0244628 A1 | 8/2015 | Gredler et al. | |
| 2016/0352631 A1 | 12/2016 | Medved et al. | |

OTHER PUBLICATIONS

Alimi et al., "ALTO Protocol," ALTO WG, Internet-Draft, draft-ietf-alto-protocol-06.txt, Oct. 25, 2010, 66 pp.

Chandra et al., "BGP Communities Attribute," Network Working Group, RFC 1997, Aug. 1996, 6 pp.

Gredler et al., "Advertising Traffic Engineering Information in BGP," Inter-Domain Routing, Internet Draft, draft-gredler-bgp-te-00, Mar. 3, 2011, 18 pp.

Li et al., "IS-IS Extensions for Traffic Engineering," Network Working Group, RFC 5305, Oct. 2008, 15 pp.

Penno et al., "ALTO Protocol," ALTO WG, Internet-Draft, draft-penno-alto-protocol-00.txt, Mar. 4, 2009, 22 pp.

Penno et al., "ALTO and Content Delivery Networks," Network Working Group, Internet Draft, draft-penno-alto-cdn-00, Jun. 4, 2010, 19 pp.

Penno et al., "ALTO and Content Delivery Networks," Network Working Group, Internet Draft, draft-penno-alto-cdn-03, Mar. 14, 2011, 28 pp.

Rekhter et al., "A Border Gateway Protocol 4 (BGP-4)", Network Working Group, RFC 4271, Jan. 2006, 93 pp.

Seedorf et al., "Application-Layer Traffic Optimization (ALTO) Problem Statement," RFC 5693, Network Working Group, Oct. 2009, 15 pp.

Seedorf et al., "Traffic Localization for P2P-Applications: The ALTO Approach," IEEE P2P'09, Sep. 9-11, 2009, 7 pp.

Sheng et al., "Application Layer Traffic Optimization in the eMule System," 2010 Fifth International Conference on Internet and Web Applications and Services, May 9-15, 2010, 6 pp.

Ye et al., "A Scheme to Solve P2P ALTO Problem," 2010 Second International Workshop on Education Technology and Computer Science, Mar. 6-7, 2010, 4 pp.

Zimmermann, "OSI Reference Model—The ISO Model of Architecture for Open Systems Interconnection," IEEE Transactions on Communications, vol. 28, No. 4, Apr. 1980, 8 pp.

U.S. Appl. No. 14/616,474, by Jan Medved, filed Feb. 6, 2015.

(56) References Cited

OTHER PUBLICATIONS

Prosecution History from U.S. Pat. No. 8,959,139, Aug. 17, 2012, through Dec. 15, 2014, 129 pp.
Prosecution History from U.S. Pat. No. 8,954,491, dated Feb. 17, 2011, through Dec. 11, 2014, 97 pp.
Office Action from U.S. Appl. No. 14/616,474, dated Aug. 25, 2017, 13 pp.
Knoll, "A Concept of Inter-AS Priority Signaling using BGP Attributes," Networks 2008 International Telecommunications Network Strategy and Planning Symposium, Sep. 28-Oct. 2, 2008, 14 pp.
U.S. Appl. No. 14/616,474, by Juniper Networks, Inc., (Inventors: Medved et al.), filed Feb. 6, 2015.
Response to Office Action dated Aug. 25, 2017, from U.S. Appl. No. 14/616,474, filed Nov. 21, 2017, 16 pp.
Bates et al., "Multiprotocol Extensions for BGP-4," RFC 4760, Network Working Group, Jan. 2007, 12 pages.
Harrison et al., "IPv6 Traffic Engineering in Is-Is," Rfc 6119, Internet Engineering Task Force (Ietf), Feb. 2011, 10 pages.
Katz et al., "Traffice Engineering (TE) Extensions to OSPF Version2, "RFC 3630, Network Working Group, Sep. 2003, 14 pages.
Kompella et al., "Is-Is Extensions in Support of Generalized Multi-Protocol Label Switching (GMPLS)," RFC 5307, Network Working Group, Oct. 2008, 12 pages.
Kompella et al., "Routing Extensions in Support of Generalized Multi-Protocol Label Switching (GMPLS)," RFC 4202, Network Working Group, Oct. 2005, 27 pages.
Sangli et al., "BGP Extended Communities Attribute," RFC 4360, Feb. 2006, 13 pages.
Vohra et al., "BGP Support for Four-octet As No. Space," RFC 4893, Network Working Group, May 2007, 10 pages.
Response to Office Action dated Mar. 26, 2018, from U.S. Appl. No. 14/616,474, filed May 29, 2018, 16 pages.
Notice of Allowance from U.S. Appl. No. 14/616,474, dated Jul. 2, 2018, 14 pages.
Action from U.S. Appl. No. 14/616,474, dated Mar. 26, 2018, 19 pages.

\* cited by examiner

|  | Endpoints |
|---|---|
| PID-0 | [10A, 10B] |
| PID-1 | [10C] |
| PID-2 | [BR 16A] |
| PID-3 | [BR 16B] |

FIG. 2A

|  | Endpoints |
|---|---|
| PID-20 | [20B] |
| PID-21 | [20A, 20C] |
| PID-22 | [BR 18A] |
| PID-23 | [BR 18B] |

FIG. 2B

|  | PID-0 | PID-1 |
|---|---|---|
| PID-2 | 2 | 3 |
| PID-3 | 6 | 4 |

FIG. 3A

|  | PID-20 | PID-21 |
|---|---|---|
| PID-22 | 11 | 15 |
| PID-23 | 16 | 8 |

FIG. 3B

| PID | PID | Total Cost |
|---|---|---|
| PID-0 | PID-20 | 13 |
| PID-0 | PID-21 | 14 |
| PID-1 | PID-20 | 14 |
| PID-1 | PID-21 | 12 |

FIG. 4

APPLICATION-LAYER TRAFFIC OPTIMIZATION SERVICE ENDPOINT TYPE ATTRIBUTE

This application is a continuation of U.S. patent application Ser. No. 12/861,671, filed Aug. 23, 2010, which claims the benefit of U.S. Provisional Application No. 61/349,467, filed May 28, 2010, the entire contents of each of which being incorporated herein by reference.

TECHNICAL FIELD

The invention relates to computer networks and, more specifically, to enhancing content delivery.

BACKGROUND

Peer-to-peer (P2P) applications exchange large amounts of data and generate significant amounts of network traffic. P2P applications leverage multiple copies of data content populated to multiple different network nodes to allow a requesting agent to obtain portions of the data content from one or more of many possible data sources. Such P2P distributed applications improve application performance and scalability and are frequently used for file sharing, real-time communication, and on-demand media streaming.

Many P2P applications operate by implementing an application layer overlay network over the communication network. The overlay network is a logical network of participating network nodes (peers) directly interconnected via overlay links that are each abstractions of one or underlying transport links of the communication network. The overlay network include data structures that index one or more network devices (or "resources") that store and source specific data content, such as files or file portions. A peer seeking particular data content queries the data structures to obtain a list of identities of network devices that source the file. The peer (here operating as a client) randomly selects one of the devices from the list from which to request and receive the data content via the overlay network.

Client software for P2P applications often select resources naively, that is, without incorporating network topology information or related details. Rather, clients rely on heuristics to approximate such information. As a result, network data traffic exchanged using these applications may congest network links, cross service provider network boundaries multiple times, and generally transit the communication network in a manner that is suboptimal from a user-standpoint and undesirable from the point of view of the service provider. For instance, while two peers may be members of the same service provider network, an overlay link connecting the peers may nevertheless traverse multiple network boundaries, which unnecessarily increases the inter-peer transit costs to the service provider. Furthermore, although distributed applications capitalize on excess bandwidth at the data sources to improve throughput and reduce latencies for end-users while also reducing the burden of content providers to provision application servers, the ability to cheaply distribute data content comes at the expense of service providers, which bear the cost of inefficiently transporting network data.

Recently, an Application-Layer Traffic Optimization (ALTO) service has been proposed in which an ALTO protocol is used to provide guidance to P2P applications regarding selection of a resource from which to obtain data content. In one example, a service provider would provisions an ALTO server for a service provider network with network topology and topology link cost information. P2P clients would send ALTO requests to the ALTO server to obtain a network map and a corresponding cost map. The network map specifies a sub-set of topological groupings defined by the ALTO server for the network. A cost map for the network map defines provider preferences respecting inter-group routing costs for connections among the various groups of the network map. As a result, service providers provisioning the ALTO server could direct P2P clients to select resources according to service provider preferences, which may include optimizing throughput and/or user experience, for instance, reducing costs to the service provider, or promoting other provider objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol draft-ietf-alto-protocol-03.txt," ALTO Working Group, the Internet Engineering Task Force draft, March 2010, each of which is incorporated herein by reference in its entirety.

SUMMARY

In general, the invention is directed to techniques for enhancing the ALTO service for integration with content delivery networks (CDNs). For example, this document describes deployment scenarios and enhancements for an ALTO Service in the case of CDNs where content is delivered to applications in accordance with a more traditional client/server model. Other enhancements described herein may be useful in other deployments, such as in use with P2P applications or distributed applications.

Content providers increasingly rely on content delivery networks to distribute content requested by a geographically- and capability-diverse clientele. In many instances, the CDNs and service provider (SP) networks that function as access networks for subscriber devices attempting to reach CDN cache nodes that store and source resources are often disjoint. That is, the CDNs and SP networks may be members of different administrative domains, and hence may not share internal routing cost information. Service providers may deploy an ALTO service to optimize CDN performance in accordance with the principles described herein in a manner that provides the service transparently to users, such that user hosts do not require special software or other modifications. In a simple example, users operating a standard Internet browser may experience CDN optimizations enabled by an enhanced ALTO service.

In one example, techniques are described in which a federated ALTO server combines information contained in network and cost maps for a CDN as well as network and cost maps for one or more SP networks that provide access to the CDN to compute a master cost map that may enhance host selection for one or more endpoints. The federated ALTO server generates, in accordance with an ALTO service, network and cost maps for the CDN. The network and cost maps include, within the mapping of possible endpoints and endpoint groups (hereinafter alternatively referred to as "PIDs"), CDN border routers that couple the CDN to border routers for the SP networks. A PID may represent a single device or device component, a collection of devices such as a network subnet, an SP network, or some other grouping. The federated ALTO server uses the network and cost maps to calculate a cost matrix for topology links connecting each CDN node to every border router that couples the CDN to a SP network served by the CDN.

The federated ALTO server additionally requests and receives network and cost maps from individual ALTO servers for the SP networks. By linking entries in the CDN network map to entries in the SP networks' network maps according to existing inter-domain connections, then summing the entries in the calculated cost matrix with respective cost information contained in the various SP networks cost maps received, the federated ALTO server creates a master cost map having entries for topology links that span multiple administrative domains (i.e., the CDN and the one or more SP networks). When, for instance, a CDN domain name system (DNS) name server receives a DNS query from an SP network subscriber, the CDN DNS uses the master cost map to determine the best CDN cache node for the subscriber and returns a network address for the node. In this manner, the techniques may allow the subscriber to use such information to perform better-than-random selection of the cache node with which it establishes connections.

In another example, techniques are described for adding attributes to network map entries to further characterize PIDs described therein. The techniques enable an ALTO service to disambiguate among multiple PID types to, for instance, filter unwanted PIDs from network maps, ensure that PIDs for particular PID types may include only a single endpoint device, and set default or otherwise affect cost map entry values for PID pairs according to pair member types.

For instance, in a CDN context, the techniques specify adding attributes to a network map entries that specifies whether a PID is of type "host," "CDN cache node," "mobile host," or "wireline host." A redirector provides location information to requesting hosts to enable the hosts to connect to CDN cache nodes. A host may represent a host subnet. In this instance, an ALTO server operating in accordance with the described techniques uses the attributes to generate a cost map to the redirector that has cost map entry values set to infinity for inter-CDN cache node pairs and inter-host pairs. When the ALTO server receives requests from an ALTO client operating on the redirector, the ALTO server provides a sparse matrix for the cost map that excludes entries having infinite cost. That is, the ALTO server provides only costs entries for those node pairs for which the inter-node cost is a value other than infinity. When the ALTO client receives the sparse matrix cost map, the ALTO client interprets the empty entries in the map as having a default value of infinity and may populate a full cost map with the infinite values. Thereafter the redirector, upon receiving a content request (e.g. an HTTP GET request) from a host, consequently selects a CDN cache node as a content resource due to default value infinite costs specified in the full cost map for paths to other hosts.

In another example, techniques for updating ALTO servers and pushing incremental network map revisions to ALTO clients are described. CDN cache nodes or other content servers may experience outages, congestion, or experience other conditions that impacts content serving performance of the node. The CDN cache nodes provide status updates to the ALTO server, which incorporates the status update into calculation of ALTO network maps and cost maps. For example, a CDN cache node may send the ALTO server a status update stating that its content service is not operational. The ALTO server thus removes the node from the network map and updates the cost map accordingly. Because status updates regarding congestion or other network conditions may result in frequent modifications to the network map, the techniques cause the ALTO server to proactively update ALTO clients with incremental network map and cost map revisions. The incremental network map revisions enable the ALTO clients to update a prior version of the network map, rather than receive the full network map in the update. In this manner, the techniques may allow ALTO clients to maintain current network and cost maps yet avoid traffic in the network that would otherwise result from frequent complete network or cost map transmissions.

In one embodiment, the invention is directed to a method comprising the steps of aggregating, with an application-layer traffic optimization (ALTO) server that stores network topology information for a network of one or more endpoints, the endpoints into a set of one or more PIDs, wherein each PID is associated with a subset of the endpoints, and wherein each endpoint associated with a particular PID in the set of PIDs is a member of the same type. The method additionally comprises the step of assigning a PID-type attribute to each of the PIDs, wherein a PID-type attribute specifies a type for the subset of endpoints associated with the PID. The method additionally comprises the step of generating, with the ALTO server, an ALTO network map that includes a PID entry to describe each of the PIDs, wherein each PID entry includes a PID-type field that stores the assigned PID-type attribute for the PID described by the PID entry.

In another embodiment, the invention is directed to a method comprises the steps of receiving, with a redirector device, an ALTO network map that includes PID entries to describe each of a set of one or more PIDs, wherein each of the PIDs is associated with a subset of one or more endpoints of a network, and wherein each of the PID entries includes a PID-type field that stores a PID-type attribute that specifies a type for the subset of endpoints associated with the PID described by the PID entry. The method also comprises the step of receiving, with the redirector device, a first ALTO cost map that comprises a sparse matrix of cost entries for the network that consists of cost entries for fewer than a full set of pair-wise combinations of the set of PIDs, wherein each cost entry specifies a different pair of the PIDs and an associated cost value that represents a cost to traverse a network path between the members of the PID pair. The method additionally comprises the step of generating a second ALTO cost map that comprises a full matrix of cost entries using the sparse matrix of cost entries by interpreting each missing cost entry in the sparse matrix as having a default cost value of infinity.

In another embodiment, the invention is directed to an application-layer traffic optimization (ALTO) server comprising a network information base to store network topology information for a network of one or more endpoints. The ALTO server also comprises a network map module to aggregate the endpoints into a set of one or more PIDs, wherein each PID is associated with a subset of the endpoints, and wherein each endpoint associated with a particular PID in the set of PIDs is a member of the same type, wherein the network map module assigns a PID-type attribute to each of the PIDs, wherein a PID-type attribute specifies a type for the subset of endpoints associated with the PID, and wherein the network map module generates an ALTO network map that includes a PID entry to describe each of the PIDs, wherein each PID entry includes a PID-type field that stores the assigned PID-type attribute for the PID described by the PID entry.

In another embodiment, the invention is directed to a redirector device comprising a location database and an application-layer traffic optimization (ALTO) client to receive an ALTO network map that includes PID entries to describe each of a set of one or more PIDs, wherein each of the PIDs is associated with a subset of one or more endpoints of a network, and wherein each of the PID entries includes a PID-type field that stores a PID-type attribute that specifies a type for the subset of endpoints associated with the PID described by the PID entry, wherein the ALTO client requests an ALTO cost map for the network from an ALTO server, wherein the ALTO client receives, in response to the request, a first ALTO cost map that comprises a sparse matrix of cost entries for the network that consists of cost entries for fewer than a full set of pair-wise combinations of the set of PIDs, wherein each cost entry specifies a different pair of the PIDs and an associated cost value that represents a cost to traverse a network path between the members of the PID pair. The ALTO client generates a second ALTO cost map that comprises a full matrix of cost entries using the sparse matrix of cost entries by interpreting each missing cost entry in the sparse matrix as having a default cost value of infinity, and the ALTO client stores the second ALTO cost map to the location database.

In another embodiment, the invention is directed to a computer-readable storage medium comprising instructions. The instructions cause a programmable processor to aggregate, with an application-layer traffic optimization (ALTO) server that stores network topology information for a network of one or more endpoints, the endpoints into a set of one or more PIDs, wherein each PID is associated with a subset of the endpoints, and wherein each endpoint associated with a particular PID in the set of PIDs is a member of the same type. The instructions additionally cause the programmable processor to assign a PID-type attribute to each of the PIDs, wherein a PID-type attribute specifies a type for the subset of endpoints associated with the PID. The instructions additionally cause the programmable processor to generate an ALTO network map that includes a PID entry to describe each of the PIDs, wherein each PID entry includes a PID-type field that stores the assigned PID-type attribute for the PID described by the PID entry.

The techniques described in this disclosure may provide one or more advantages. For example, the techniques may allow enhanced integration of an ALTO service with CDNs, leading to improvements in resource selection for content requests according to provider-specified optimization data. For example, pushing incremental updates of current network maps and cost maps for a network provides ALTO clients with up-to-date resource selection information and may foster service continuity. Moreover, the techniques may allow independent scaling of redirectors and endpoint health management.

As another example, the attribute addition techniques may allow resource selection components to differentiate between content providers (e.g., CDN cache nodes) and content consumers (e.g., hosts) and thereby restrict resource selection to content providers. PID attributes may further enable PID-type-specific policies to allow service providers to perform, for instance, service discrimination. For example, a service provider may mark a PID with an attribute that causes those endpoints in that PID to receive higher quality of service (QoS). In addition, introducing default costs into a master cost map may enable an ALTO server to selectively advertise cost entries of a master cost map to ALTO clients.

As a still further example, the techniques may allow ALTO servers to share internal network maps and costs maps across network boundaries to enable application layer traffic optimization techniques to span multiple administrative domains. Consequently, the techniques may enable a multi-domain optimized resource selection, rather than multiple locally optimized PID selections that frequently result in globally sub-optimal resource selection due to inter-network boundary effects.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 2A-2B illustrate exemplary network maps for the exemplary network system of FIG. 1.

FIG. 3A-3B illustrate respective, exemplary border router cost matrices calculated by an ALTO server using the network maps of FIGS. 2A-2B and according to the techniques of this disclosure.

FIG. 4 illustrates an exemplary master cost map generated by an ALTO server in accordance with the techniques of this disclosure.

DETAILED DESCRIPTION

Figure 1:
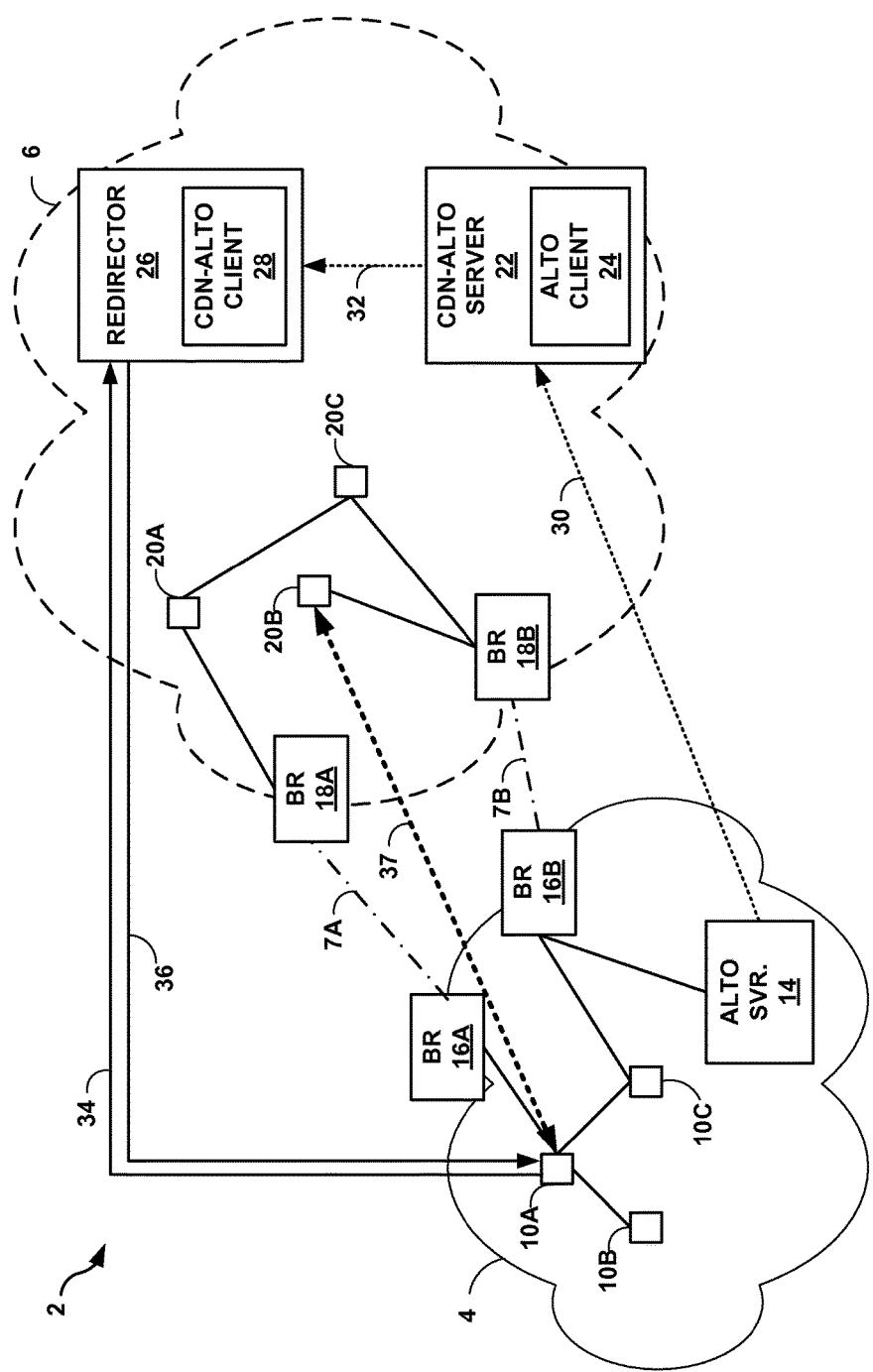
FIG. 1 is a block diagram illustrating an exemplary network system in which one or more network devices perform the techniques described in this disclosure to enhance an operation of Application-Layer Traffic Optimization in a content delivery network.

FIG. 1 is a block diagram illustrating an exemplary network system 2 in which one or more network devices perform the techniques described in this disclosure to enhance an Application-Layer Traffic Optimization for seamless and transparent integration with a content delivery network. As shown in FIG. 1, exemplary network system 2 includes both content delivery network 6 and access network 4. Access network 4 may represent a public network that is owned and operated by a service provider to provide network access to one or more subscriber devices. As a result, access network 4 may be referred to herein as a service provider (SP) network. In some instances, access network 4 may represent one or more autonomous systems under control of a single administrator or cooperative group of administrators. Access network 4 may connect to one or more customer networks (not shown) that each constitute a layer two (L2) wired or wireless network. Reference to numbered layers may refer to a particular layer of the Open Systems Interconnection (OSI) model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. For example, the term "application layer" refers to layer seven of the OSI model.

Content delivery network (CDN) 6 is a network of interconnected devices that cooperate to distribute content to clients using one or more services. Such content may include, for instance, streaming media files, data files, software, domain name system information, documents, database query results, among others. Accordingly, examples of services offered by CDN 6 may include hyper-text transfer protocol (HTTP), media streaming, advertising, file transfer protocol (FTP), and others. CDN 6 comprises CDN cache nodes 20A-20C (alternatively, "CDN nodes") that contain replicated content and serve that content to requesting devices using, for example, a transmission control protocol (TCP) or user datagram protocol (UDP) session operating over intermediate devices of CDN 6 (not shown for simplicity). A content provider administers CDN nodes 20 to optimize content delivery using load balancing techniques, caching, request routing, and/or content services. CDN nodes 20 may mirror content, though any of CDN nodes 20 may provide different services and data content than that provider by the other CDN nodes. In some embodiments, CDN 6 is also a service provider network or other access network.

Border routers 16A-16B ("BRs 16") of access network 4 couple to respective border routers 18A-18B ("BRs 18") of CDN 6 via respective transit links 7A-7B to provide devices of network 4 access to content sourced by CDN nodes 20. Border routers 16 and border routers 18 may each comprise, for example, an autonomous system border/boundary router or a provider edge router that execute the border gateway protocol (BGP) to advertise, to the other routers (or peers), network destinations to which the router offers connectivity.

Hosts 10A-10C host applications that connect to CDN 6 via access network 4 to request and download application related content. Hosts 10 are subscriber devices and may comprise, for example, workstations, desktop computers, laptop computers, cellular or other mobile devices, Personal Digital Assistants (PDAs), and any other device cable of connecting to a computer network via a wireless and/or wired connection. In some embodiments, hosts 10 are members of a customer network that couples to borders routers 16 via access network 4.

Content delivery network 6 comprises redirector 26 to receive content requests from hosts 10, selects and locate one of CDN nodes 20 that is capable of servicing the request, and redirecting the requesting host to the identified CDN node. Redirector 26 may be, for example, a DNS or other type of server, a proxying device, a P2P peer, a P2P application-specific tracker, or a firewall or other security device. In one instance, redirector 26 implements DNS server load balancing (SLB). In some instances, redirector 26 is a content-aware redirector that maps particular content or content-types to each of CDN nodes 20 that store and source the particular content or content-types. In such instances, redirector 26 selects one of CDN nodes 20 to service a request according to content or content-type availability. In some instances, redirector 26 is a service-aware redirector that maps services to each of CDN nodes 20 that provide the service irrespective of whether the CDN node presently stores content for the service. In such instances, redirector 26 selects one of CDN nodes to service a request according to service capabilities. If a selected one of CDN nodes 20 that provides the service does not store the content, the CDN node requests and receives the content from a centralized server (not shown) or from another one of CDN nodes 20.

In some embodiments, redirector 26 is a content-aware or service-aware redirector for HTTP. That is, redirector 26 receives HTTP requests for content from HTTP clients and redirects the request to a selected one of CDN nodes 20 by returning, to the requesting device, an HTTP response having status-code 302 and including a network address of the selected CDN node. In some embodiments, hosts 10, CDN nodes 20, and redirector 26 are P2P peers connected in an overlay network to exchange location information and content using a P2P application. In such P2P embodiments, redirector 26 may be a centralized server for the P2P application that indexes content to peers and provides location information rather than a peer.

To influence the selection of a particular CDN node 20 to service a particular request received from a network device, CDN 6 additionally employs an Application-Layer Traffic Optimization (ALTO) service that is provided by CDN-ALTO server 22 of CDN 6. In general, the ALTO service enables CDN 6 to influence the selection process to further content provider objectives, which may include improving user-experience by selecting the most geographically proximate one of CDN nodes 20 to a requesting host 10, reducing transmission costs to the content provider, load balancing, service-level discrimination, accounting for bandwidth constraints, and other objectives.

CDN-ALTO server 22 stores a network map and cost map for CDN 6 and provides these maps to ALTO clients, such as CDN-ALTO client 28 of redirector 26. As described in detail below with respect to FIG. 7, a network map contains network location identifiers, or PIDs, that each represents one or more network devices in a network. In general, a PID may represent a single device or device component, a collection of devices such as a network subnet, an SP network, or some other grouping. The network map stored by CDN-ALTO server 22 includes PIDs that represent at least CDN nodes 20 and border routers 18. As described in detail below with respect to FIG. 8, a cost map contains cost entries for pairs of PIDs represented in the network map and an associated value that represents a cost to traverse a network path between the members of the PID pair. The value can be ordinal (i.e., ranked) or numerical (e.g., actual). CDN-ALTO server 22 may generate the network maps and cost map by obtaining routing information from other devices in CDN 6 and then applying policies to the routing information to aggregate endpoint devices into PIDs and calculate costs, per a specified criteria such as transmission cost or node priority, for traversing a network path between members of PID pairs. In some embodiments, a CDN administrator or a third party provisions CDN-ALTO server 22 with a network map and cost map. In accordance with the techniques of this disclosure, CDN-ALTO server 22 represents each of border routers 18 in the network map for CDN 6 with a unique PID that represents no additional network devices. CDN-ALTO server 22 may be, for example, a high-end server or other service device, a content indexer for a P2P application, or a service card insertable into a network device, such as a router or switch. CDN-ALTO server 22 may operate as an element of a service plane of a router to provide ALTO services in accordance with the techniques of this disclosure.

Access network 4 also implements an ALTO service using ALTO server 14, which stores a network map and cost map for access network 4. The network map stored by ALTO server 14 includes PIDs that represent at least hosts 10 and border routers 16. ALTO server 14 represents each of border routers 16 in the network map for access network 4 with a unique PID that represents no additional network devices.

CDN-ALTO server 22 performs techniques of this disclosure to improve selection of a CDN host 20 in the CDN 6 domain for a host 10 in the access network 4 domain. In accordance with these techniques, CDN-ALTO server 22 comprises ALTO client 24 that uses an ALTO protocol to request and receive, from ALTO server 14 of access network 4, the network map and cost map for access network 4.

CDN-ALTO server 22 additionally may execute a routing protocol, such as Interior BGP, to discover border routers 18 that couple CDN 6 to access network 4. In some embodiments, rather than using a routing protocol to discover embodiments, PIDs in the network map for CDN 6 include a border router attribute that CDN-ALTO server 22 may use to identify the PID as representing one of border routers 18. After determining the PID for these discovered border routers 18 from the network map for CDN 6, CDN-ALTO server 22 uses the network map and cost map for CDN 6 to calculate a CDN border router cost matrix that specifies a cost of reaching each of border routers 18 from every one of CDN nodes 20.

CDN-ALTO server 22 then calculates a similar border router cost matrix for access network 4. That is, CDN-ALTO server 22 uses the network map and cost map for access network 4 obtained by ALTO client 24 from ALTO server 14 to calculate an access network border router cost matrix that specifies a cost of reaching each of border routers 16 from every one of hosts 10.

Using the two costs matrices (for CDN 6 and access network 4, respectively), CDN-ALTO server 22 relates border router 16A to border router 18A and border router 16B to border router 18B due to their respective coupling over transit links 7A and 7B. In addition, CDN-ALTO server 22 intersects the two cost matrices in a master cost map using the border router relations as a link and sums individual costs from the respective cost matrices to compute a total cost for the intersection entries. In other words, CDN-ALTO server 22 computes the total cost of reaching each one of hosts 10 from every CDN node 20. For example, to compute a total cost of reaching host 10A from CDN node 20B, CDN-ALTO server 22 determines (using the access network 4 cost matrix) a first cost from the host 10A PID to the border router 16A PID and determines a second cost (using the CDN 6 cost matrix) from the border router 18A PID to the CDN node 20B PID. CDN-ALTO server 22 then sums the first and second costs and inserts the summation in an entry in a master cost map for the <host 10A PID, CDN node 20B PID> pair.

In the illustrated example, because there are multiple border routers 16 and 18 that traffic exchanged between host 10A and CDN node 20 may traverse, CDN-ALTO server 22 may perform the intersection/summation process for each combination or border routers 16 and border routers 18. Thus, in addition to the calculation described above, CDN-ALTO server 22 may compute a total cost for a network path comprising <host 10A PID, border router 16A PID> and <border router 18B PID, CDN node 20B PID>. CDN-ALTO server 22 may then select the lowest total cost of any possible combination to enter in the entry in the master cost map for the <host 10A PID, CDN node 20B PID> pair. In embodiments having additional links connecting border routers 16 and border routers 18, CDN-ALTO server 22 performs additional calculations corresponding to the additional links. In some instances, CDN-ALTO server 22 incorporates the appropriate transit link 7 cost into the summation. An exemplary computation according to these techniques is illustrated in FIG. 2.

CDN-ALTO client 28 of may request and receive, from CDN-ALTO server 22, the master cost map, the network map for CDN 6, and the network map for access network 4. Hosts 10 send content requests to redirector 26. In accordance with the described techniques, redirector 26 queries the master cost map to select the lowest-cost node from among CDN nodes 20 for the requesting host and returns a network address for the selected CDN node for the content request. Redirector 26 uses the network map for access network 4 to map the source IP address of the requesting host 10 to a PID. Redirector 26 then uses the master cost map to select the lowest-cost CDN node 20 for the PID.

For example, in the illustrated embodiment, host 10A sends content request 34 to redirector 26, which uses the master cost map and network maps for access network 4 and CDN 6 to select and return a network address for CDN node 20B to host 10A in content response 36. Host 10A establishes communication session 37 (e.g., a TCP session) with CDN node 20B to obtain the requested content. In one instance, a user operating an Internet browser application types a Uniform Resource Identifier (URI) in the address bar, causing the application to send (in this example) HTTP request 34 that includes the URI to redirector 36. Redirector 36 maps the URI to CDN nodes 20 that are HTTP servers and store the content for the URI (e.g., a web page), selects one of the mapped nodes using the master cost map, then returns HTTP response 36 that includes the network address for the selected node to the browser application running on host 10A. The browser application may then send a second HTTP request to the selected CDN node 20 via communication session 37 to obtain the sought-after content. In some embodiments, ALTO server 14 and ALTO client 24 exchange information using encryption methods provided by HTTP.

FIGS. 2A and 2B illustrate exemplary network maps 40 and 42, respectively, for access network 4 and CDN 6 of FIG. 1. As one example, network map 40 includes a PID entry that maps hosts 10A and 10B of access network 4 of FIG. 1 to the PID identified as "PID-1." In some instances, PID entries for network maps 40 and 42 include an attribute that identifies whether the PID represents a border router. For ease of illustration, network maps 40 and 42 are shown in a simplified representation. A more detailed network map is illustrated and discussed below with respect to FIG. 7.

FIG. 3A illustrates an exemplary access network border router cost matrix 44 calculated by CDN-ALTO server 22 using network map 40 and a cost map received from ALTO server 14 of access network 4. As illustrated, access network border router cost matrix 44 is a many-to-many mapping (abstracted using network map 40 PIDs) of each of border routers 16 to every one of hosts 10.

FIG. 3B illustrates an exemplary CDN border router cost matrix 44 calculated by CDN-ALTO server 22 using network map 42 and a cost map for CDN 6. As illustrated, CDN border router cost matrix 46 is a many-to-many mapping (abstracted using network map 42 PIDs) of each of border routers 18 to every one of CDN nodes 20.

FIG. 4 illustrates exemplary master cost map 48 computed by CDN-ALTO server 22 for access network 4 and CDN 6 of FIG. 1. Master cost map 48 comprises entries that provide a total cost to traverse a network path between a PID of access network 4 and a PID of CDN 6. In accordance with the techniques of this disclosure, CDN-ALTO server 22 generates master cost map 48 by intersecting network maps 40 and 42 using respective couplings of border routers 16 and border routers 18 as links between the network maps. Thus, master cost map 48 includes PID pair-wise entries for each combination of host 10 PIDs of network map 40 and CDN node 20 PIDs of network map 42.

By summing the costs from appropriate entries in access network border router cost matrix 44 and CDN border router cost matrix 46, CDN-ALTO server 22 determines the cost for each PID pair entry. Using a content request from host 10A (mapped to "PID-0" in network map 40) as an example, the PID pair <PID-0, PID-20> connects either via transit link 7A connecting border routers 16A and 18A or via transit link 7B connection border routers 16B and 18B. In the first instance, CDN-ALTO server 22 sums the <PID-0, PID-2> cost (2) and the <PID-22, PID-20> cost (11) to arrive at a total cost of 13 for network traffic between PID-0 and PID-20 traversing transit link 7A. In the second instance, CDN-ALTO server 22 sums the <PID-0, PID-3> cost (6) and the <PID-23, PID-20> cost (16) to arrive at a total cost of 22 for network traffic between PID-0 and PID-20 traversing transit link 7B. Because 13 is less than 16, CDN-ALTO server 22 sets 13 as the total cost for the PID pair <PID-0, PID-20> in master cost map 48.

When redirector 26 receives the content request from host 10A, redirector 26 queries the cost map for the lowest-cost PID connected to PID-0. Master cost map 48 denotes this PID as PID-20 having total cost 13 to PID-0. Redirector 26 uses network map 42 to select one of the endpoints in PID-20 (in this instance, CDN node 20B) and returns an IP address for CDN node 20 to host 10A.

Figure 5:
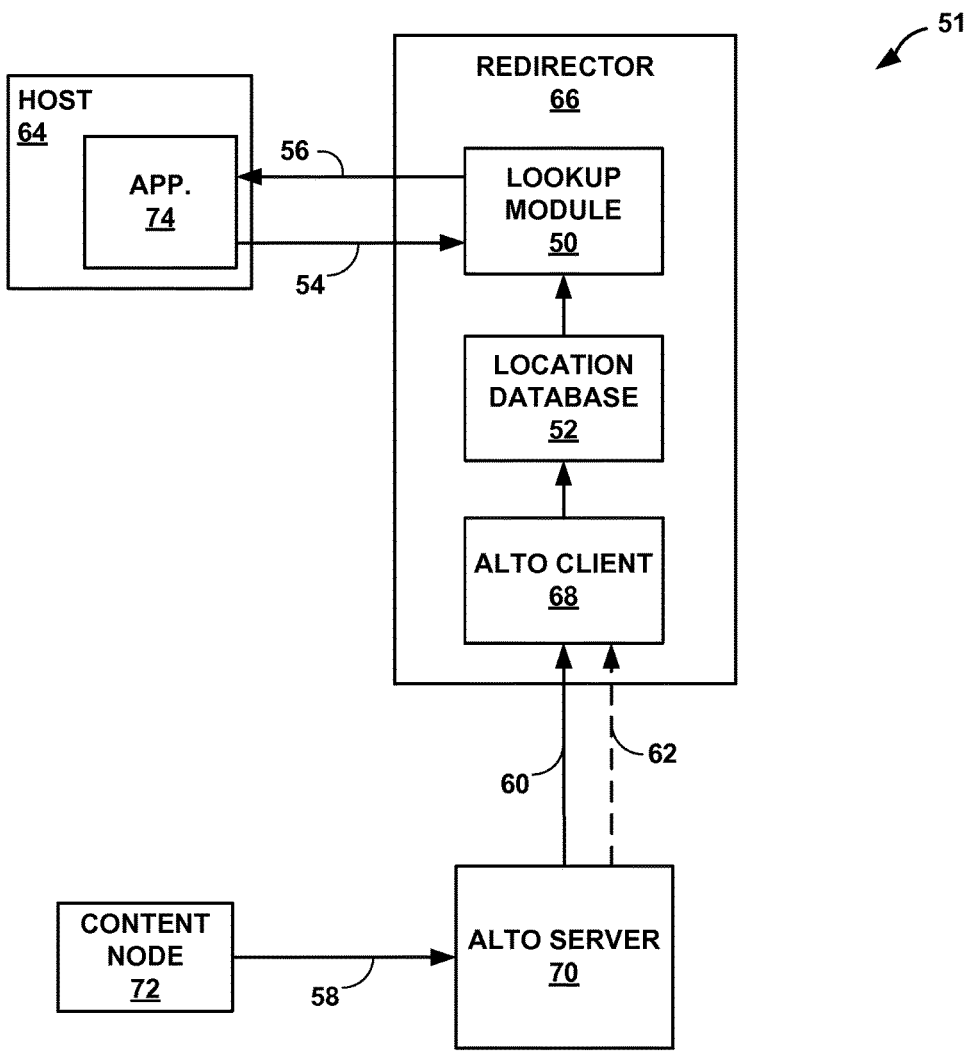
FIG. 5 is a block diagram illustrating an exemplary network system in which one or more network devices perform the techniques described in this disclosure to enhance an operation of Application-Layer Traffic Optimization in a content delivery network.

FIG. 5 is a block diagram illustrating exemplary network system 51 in which redirector 66, ALTO server 70, and content node 72 perform techniques described in this disclosure. Content node 72 sources content for a distributed application, such as a client-server application utilizing a CDN or a P2P application. Redirector 66 is a content- or service-aware redirector, such as an HTTP redirector or a DNS server. Redirector 66 and ALTO server 70 may represent redirector 26 and CDN-ALTO server 22 of FIG. 1, respectively. Content node 72 may represent any of CDN nodes 20 of FIG. 1. Redirector 66 may be responsible for a fixed set of host PIDs and be provisioned with information indicating this responsibility prior to receiving content requests.

ALTO client 68 of redirector 66 requests and receives, from ALTO server 70, a network map and cost map for the distributed application in complete maps upload message 60. ALTO client 68, in a P2P network, may be an application tracker that obtains the maps from ALTO server 70 and integrates the maps into a peer database.

Content node 72 provides to ALTO server 70 a status update 58 comprising data relating to a service-related capability, network conditions experienced by content node 72, or some other factor affecting the content-sourcing service of content node 72. Content node 72 may provide status updates to ALTO server 70 periodically or in response to a particular event, such as receiving a particular content.

ALTO server 70 receives status update 58 and uses the information contained therein to, if appropriate, modify a network map and cost map for the distributed application for the network containing content node 72 (not shown in FIG. 5). For example, if status update 58 indicates content node 72 no longer provides content-sourcing service, ALTO server 70 may remove content node 72 from the network map. As another example, if status update 58 indicates content node 72 is experiencing a severe traffic load, ALTO server 70 may increase costs for PID pairs having content node 72 as a member. ALTO server 70 may comprise policies that specify a cost-weight for particular content node 72 status indications. IN other words, the policies specify one or more cost-specific modification actions for ALTO server 70 to take responsive to particular status conditions of content node 72 indicated by status update 58.

ALTO server 70 determines a difference between a previous network map and cost map and the network map and cost map that ALTO server 70 generated as a result of receiving status update 58. In addition, ALTO server 70 generates instructions to enable ALTO client 68 to modify the network map and cost map, received by ALTO client 68 in complete maps upload message 60, to reflect the changes to the application topology. ALTO server 70 then sends these instructions to ALTO client 68 in update message 62.

In one example, ALTO server 70 receives status update 58 indicating a service failure by content node 72. In response, ALTO server 70 modifies the network map and cost map for the application, then determines a difference between the newly modified maps and the previous map. In this example, the newly modified map no longer includes content node 72 as an endpoint, which may result in a modified PID or a removed PID. ALTO server 70 generates instructions sufficient to cause ALTO client 68 to change the ALTO client 68 copy of the network and cost maps to the modified network and cost maps generated by ALTO server 70. As one possible example, the instructions may state, "REMOVE [IP address of content node 72]". ALTO server 70 pushes, unprompted, the instructions to ALTO client 68 in update message 62. That is, ALTO server 70 does not necessarily receive a request from ALTO client 68 prior to sending update message 62.

Upon receiving update message 62, ALTO client 68 modifies location database 52 comprising the network map and cost map for the application using the instructions contained in the update message 62.

In some embodiments, the newly modified map is a cost map and the network map remains unchanged. In such instances, ALTO server 70 generates instructions sufficient to cause ALTO client 68 to change the ALTO client 68 copy of the cost map to conform the ALTO client 68 cost map to the ALTO server 70 cost map. As one possible example, the instructions may state, "SETCOST PID-1, PID-2, 8", to cause ALTO client 68 to set the cost, in the client cost map, to traverse the topology link of the corresponding network map that couples PID-1 and PID-2 to 8.

Host 64 comprises application 74 that constitutes a portion of the distributed application discussed above. For example, application 74 may be a peer of a P2P application or a client of a client-server application. Application 74 may be an Internet browser. Application 74 sends content request 54 to redirector 66, to which lookup module 50 responds by querying the network and cost maps for the distributed application as updated by ALTO client 68 after receiving update message 62. Lookup module 50 selects the lowest-cost node from which to source the requested content, which in some instances is content node 72, and returns a network address for the selected node to application 74 in content response 56. In some embodiments, lookup module 50 is an HTTP server.

In some embodiments, a URI in an HTTP 302 redirect message may contain, rather than the IP address of the selected CDN node, a domain name as a result of virtual hosting. In such instances, the IP addresses contained in the cost maps may need to be correlated to domain names prior to selecting a CDN node for the requesting host.

In this manner, the real-time content node status update and incremental network and cost map update techniques described above enable policy-driven advertisements of network and cost maps that incorporate a condition of the content node into the inter-PID cost calculation process as such a condition relates to, for example, network topology, traffic load, node health, or other conditions relating to providing a service. In a P2P context, because ALTO client 68 may be an application tracker, the peer database for the application may account for current metrics such as peer availability, content availability, and localization.

Moreover, because content node 72 provides status update 58 to ALTO server 70, rather than to redirector 66, ALTO server 70 may more rapidly update ALTO client 68 in accordance with the real-time status changes by pushing map updates to ALTO client 68 in update message 62. This may reduce the amount information exchanged between ALTO server 70 and ALTO client 68. In addition, receiving status update 58 at ALTO server 70 enables the ALTO-service to operate in a different administrative domain than that occupied by redirector 66. This may enable independent scaling of health management of the content nodes (by ALTO server 70) and of redirection (by redirector 66). In many instances, redirector 66 faces much higher scaling demands.

Figure 6:
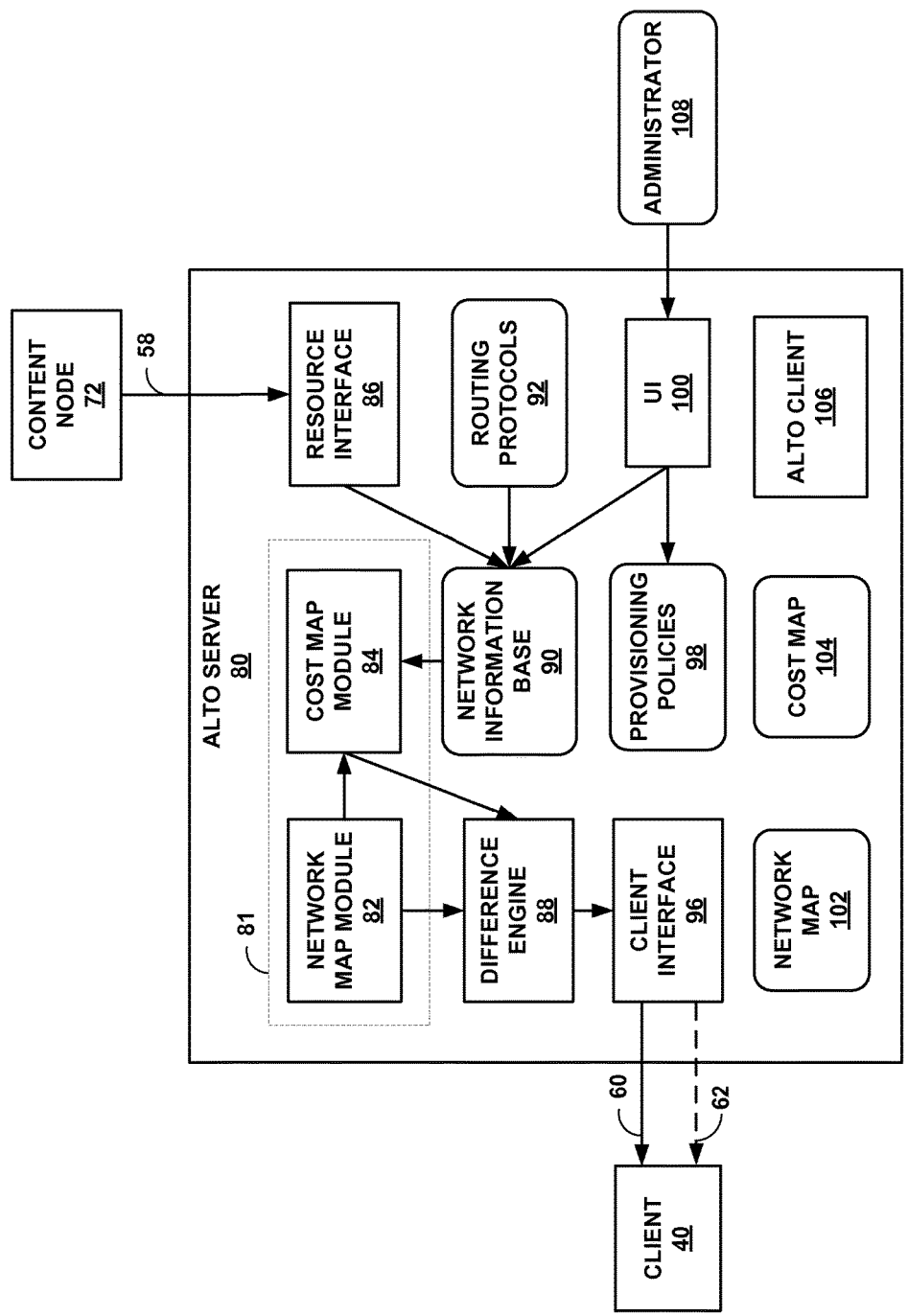
FIG. 6 is a block diagram illustrating, in detail, an ALTO server that performs techniques according to this disclosure.

FIG. 6 is a block diagram illustrating, in detail, an example ALTO server 80 that performs techniques according to this disclosure. ALTO server 80 may comprise aspects of CDN-ALTO server 22 of FIG. 1 and ALTO server 70 of FIG. 5.

In the illustrated embodiment, ALTO server 80 comprises network information base 90, a data structure that includes information regarding network topology, endpoint statuses, transmission costs for various network links, and any other information needed by map modules 81 to generate ALTO-based maps. In the illustrated example, network map module 82 uses network information base 90 to generate network map 102 and cost map module 84 uses network information base 90 to generate cost map 104. Network information base 90 is provisioned with information obtained by executing routing protocols 92 to obtain route information, from administrator 108 connecting to user interface 100 ("UI 100") to upload tables or other data structures that include network information, and from content node 72, which sends status update message 58 to resource interface 86 to update network information base with a status of the node, as described above with respect to FIG. 5. Network information base 90 may also receive network information from ALTO client 106 operating substantially similarly to ALTO client 24 of FIG. 1. That is, ALTO client 106 may request and receive network and cost maps from other administrative domains and store these maps to network information base.

Resource interface 86, in addition to receiving status update 58, discovers available content nodes (e.g., content node 72). Resource interface 86 may poll content node 72 for status update 58 using, for example, ping, an HTTP Get request, traceroute, or other methods. Resource interface 86 may comprise a simple network management protocol (SNMP) agent that connects to content node 72 or to a centralized network management server to request status update 58. Resource interface 86 may expose an application programming interface (API), which may comprise a Web service or an Extensible Messaging and Presence Protocol (XMPP)-based API.

User interface 100 may be a command-line interface (CLI), a graphical user interface (GUI), a remote procedure call (RPC), or some other method to enable administrator 108 to configure network information base 90 and provisioning policies 98 of ALTO server 80. Administrator 108 may be a network operator of, e.g., a service provider network, or a software agent executing, e.g., on a network management device. Administrator 108 additionally provisions ALTO server 80 with provisioning policies 98, a set of policies that cause network map module 82 to generate network map 102 and cost map module 84 to generate cost map 104 in accordance with administrator preferences relating to transmission costs, load balancing, service-discrimination, PID grouping, or other preference areas. For example, provisioning policies 98 may direct network map module 82 and cost map module 84 to generate maps to cause content requests from PIDs having a particular attribute to be redirected to a particular CDN node.

Network map module 82 and cost map module 84 may implement a map filtering service. The map filtering service allows ALTO clients requesting maps from ALTO server 80 to query for maps that are filtered according to various parameters. In this way, clients may avoid client side filtering and ALTO server 80 may reduce network traffic caused by unnecessarily large map transmissions. In accordance with the techniques of this disclosure, and as described in further detail below with respect to FIG. 7, network map 102 may include PID attributes that can be used to disambiguate among PIDs that contain endpoints of particular classes. Network map module 82 may employ the map filtering service to filter any PIDs from network map 102 that do not include endpoints that belong to a particular class and then send the filtered network to a requesting client.

Client interface 96 exposes an ALTO server interface to enable ALTO clients, such as client 40, to request and receive network and cost maps for an application for the network. Client interface 96 sends a copy of network map 102 and cost map 104 to client 40 in complete maps upload message 60. Client interface 96 may execute one or more protocols to obtain network addresses of ALTO clients in the network, and the client interface maintains these network addresses so as to push incremental updates of the maps to the clients.

Difference engine 88 of ALTO server 80 caches copies of network map 102 and cost map 104. Upon generation of a new network map 102 and/or cost map 104, difference engine 88 determines differences between new network map 102 and the cached copy that represents the prior version. In addition, difference engine 88 determines differences between new cost map 104 and the cached copy of the cost map that represents the prior version. Difference engine 88 then generates a series of commands that, when executed by client 40 will cause client 40 to conform its copy of the network map and cost map for the application for the network to network map 102 and cost map 104, respectively. Difference engine 88 directs client interface 96 to send these commands to client 40 in update message 62.

Figure 7:
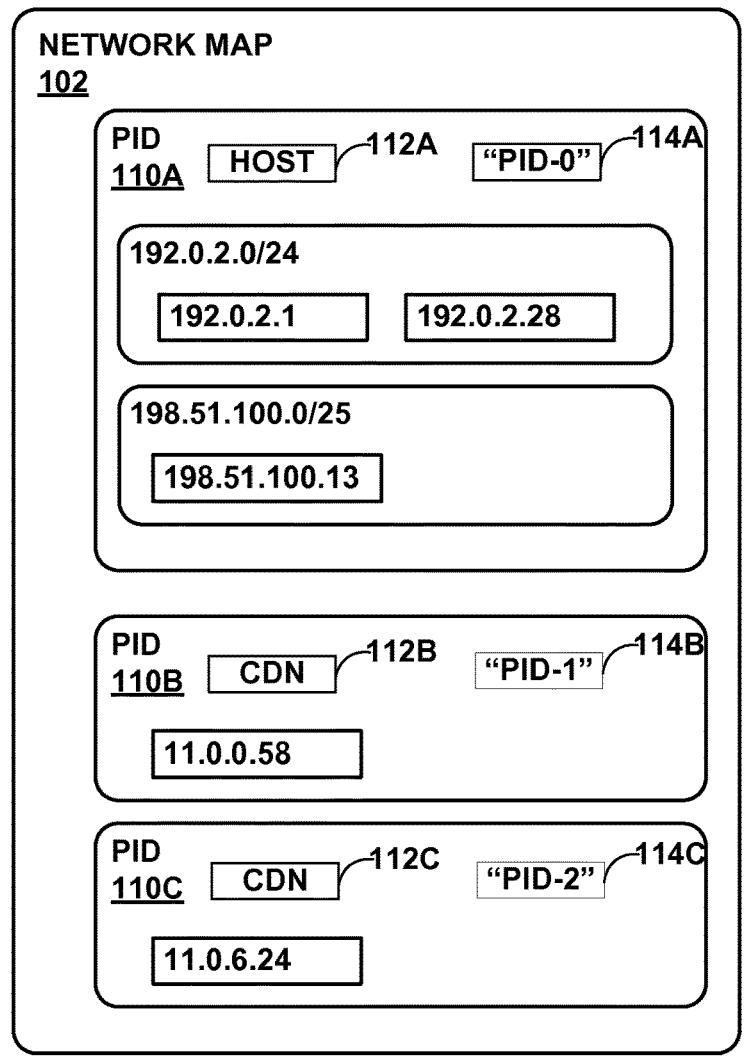
FIG. 7 is a block diagram illustrating an example network map that includes PID attributes per the described techniques.

FIG. 7 is a block diagram illustrating an example network map 102 created by an ALTO server in accordance with an ALTO service and the techniques of this disclosure. Network map 102 comprises a set of network location identifiers ("PIDs") 110A-110C each identified by a respective one of network location identifier values 114A-114C. Each of PIDs 110 constitutes an indirect and network-agnostic aggregation mechanism to represent, for instance, one or more individual endpoints, one or more subnets, metropolitan areas, points of presence ("PoPs"), one or more autonomous systems, or any combination thereof. For instance, PID 110B represents an endpoint having IP address 11.0.0.58 and has the network location identifier value "PID-1." PIDs 110 may be aggregated and network location identifiers 114 may be assigned according to any number of criteria. In some instances, an ALTO server aggregates the endpoints, subnets, etc. into one of PIDs 110 by geographical proximity. Aggregation of network endpoints into PIDs 110 provides scalability and privacy by decoupling network endpoints from their identifiers in the ALTO context. In particular, aggregation reduces the size of costs maps by reducing the size of the network and masks the network topology underlying a particular PID (representing, e.g., an autonomous system).

In accordance with the techniques of this disclosure, each of exemplary PIDs 110 includes a respective one of PID-type fields 112A-112C that stores an assigned PID-type for the PID. For instance, PID 110A includes PID-type field 112A that specifies a "host" PID-type for PID 110A, while PID 110C includes PID-type field 112C that specifies a "CDN" PID-type for PID 110C. PID 110A thus identifies host subnets and PID 110C identifies IP addresses of available CDN cache nodes.

PID-type fields 112 are attributes of respective PIDs 110 and enable an ALTO service to take PID-type-specific actions. PID-type values may be passed by the ALTO server as a constraint to a map filtering service, as described above with respect to FIG. 6. For example, an ALTO server, such as ALTO server 80, may set cost entries of an cost map that specify costs between two PIDs of type "host" to a value of infinity. A redirector or other resource selector using the cost map to select a resource for a requesting host will thus avoid selecting another host as a resource in favor of a resource with a PID of type "CDN." In some embodiments, the ALTO server may filter cost entries to avoid sending such entries to ALTO clients. Rather, the ALTO server advertises a sparse matrix of cost entries to ALTO clients. In such embodiments, the ALTO clients assume that the default cost of any missing cost entries in a received cost map is infinity.

While FIG. 7 illustrates only the "host" and "CDN" PID-types, additional PID-types may be used to represent characteristics of PIDs 110. For example, other PID-types may include "mobile hosts," "wireless hosts," or other classifications. In other examples, PID-types may include service classifications corresponding to service level agreements between customers and a service provider. These additional types may similarly be employed during resource selection to further service provider policies. As just one example, an ALTO server may identify PIDs having type "mobile host" and generate cost maps to cause a redirector to send such PIDs to a content node that hosts a low-resolution video stream.

Figure 8:
FIG. 8 an exemplary cost map corresponding to the network map of FIG. 7 and generated per the described techniques.

FIG. 8 an exemplary cost map 120 corresponding to network map 102 of FIG. 7 and generated per the described techniques. Cost map 120 accounts for an application that requires PIDs of type "host" to be redirected to PIDs of type "CDN." An ALTO server thus generates cost map 120 such that inter-host PID pairs and inter-CDN PID pairs are set to have cost of infinity. Thus, the <"PID-1", "PID-2"> entry corresponding to PIDs 110B and 110C of network map 102 of FIG. 7 has a value of infinity. The ALTO server may advertise the full matrix or a sparse matrix that the ALTO server derives from 120 to reduce network traffic.

In one example usage of network map 102 of FIG. 7 and cost map 120 of FIG. 8, a redirector (e.g., redirector 66 of FIG. 5) requests and receives cost map 120 and network map 102 from an ALTO server. Redirector 66 then receives a content request from a host having a source IP address. Redirector 66 determines a PID that contains the source IP address from network map 102. Redirector 66 then uses the cost map select the lowest-cost CDN PID for the determined PID and find an IP address of a content (e.g., CDN) node contained by the lowest-cost CDN PID. Selection of a content node contained by a PID may be random, round-robin, or based on some level of content awareness. As one example of content-awareness-directed selection, redirector 66 may send requests for the same URI to the same content node.

Figure 9:
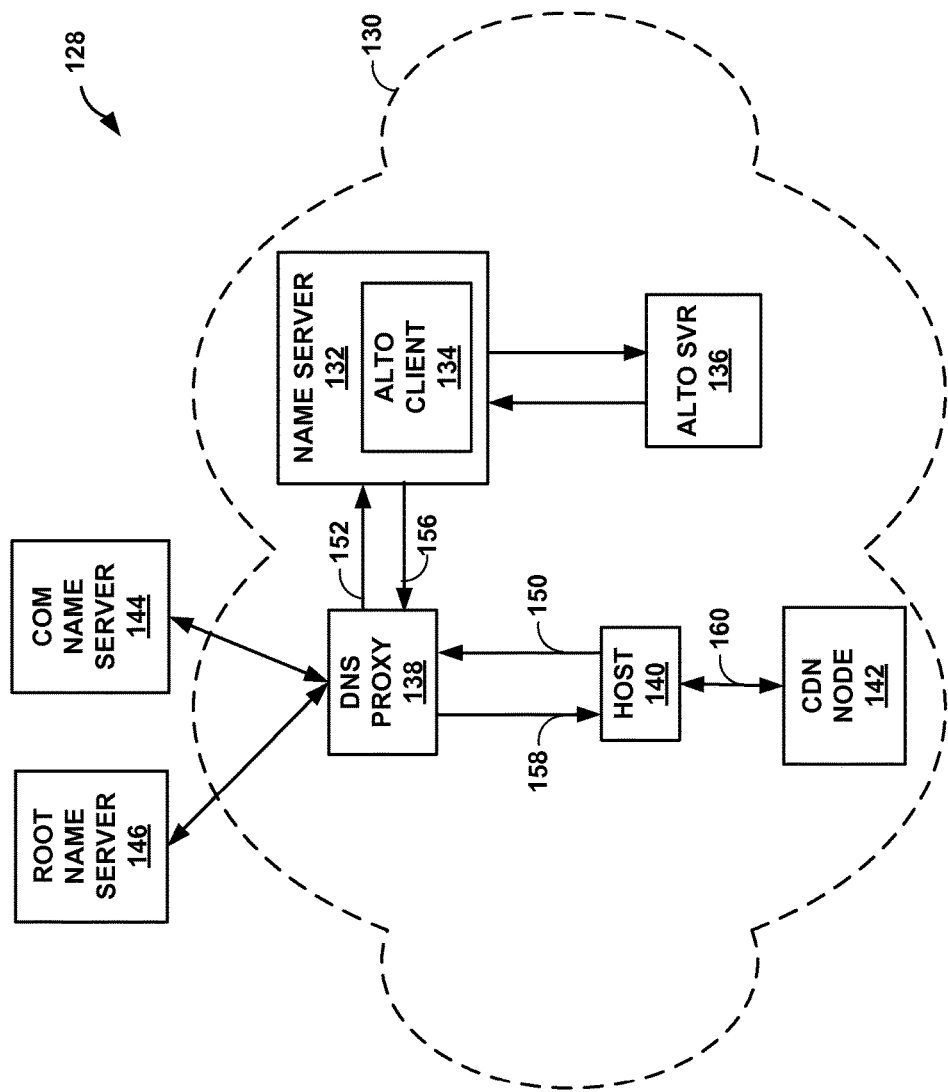
FIG. 9 is a block diagram of an exemplary network system that includes a content delivery network that employs a domain name service (DNS) and performs techniques of this disclosure.

FIG. 9 is a block diagram of an exemplary network system 128 that includes content delivery network 130 ("CDN 130") that employs a domain name service (DNS). The elements of network system 128 cooperate to perform iterative DNS lookup using DNS proxy 138. Initially, host 140 (or an application executing on host 140) send DNS query 150 to DNS proxy 138, which requests root name server 146 to the find the authoritative DNS server for the top-level domain (in this example, the top-level domain is "com"). Root name server 146 responds with a network address for COM name server 144, which DNS proxy uses to obtain the network address for the authoritative DNS server for the domain encompassed by content delivery network 130 (e.g., the "cdn.com" domain). COM name server 144 returns a network address for name server 132 to DNS proxy 138. Each of the elements of CDN 130 is within the same administrative domain.

Name server 132 is a DNS server and may operate substantially similar to redirector 66 of FIG. 5. Name server 132 comprises ALTO client 134 that requests and receives a network map and cost map from ALTO server 136 of CDN 130. DNS proxy 138 sends DNS request 152 responsive to DNS request 150 received from host 140, and name server 132 responds by selecting the most appropriate CDN node (in this instance, CDN node 142) based on the IP address of host 140 (forwarded by DNS proxy 138 in DNS request 152) and the network map and cost map received from ALTO server 136.

Name server 132 sends a DNS response 156 that includes a network address for CDN node 142, which DNS proxy 138 forwards to host 140 in DNS response 158. Host 140 establishes communication session 160 directly with CDN node 142 to obtain the sought-after content.

Figure 10:
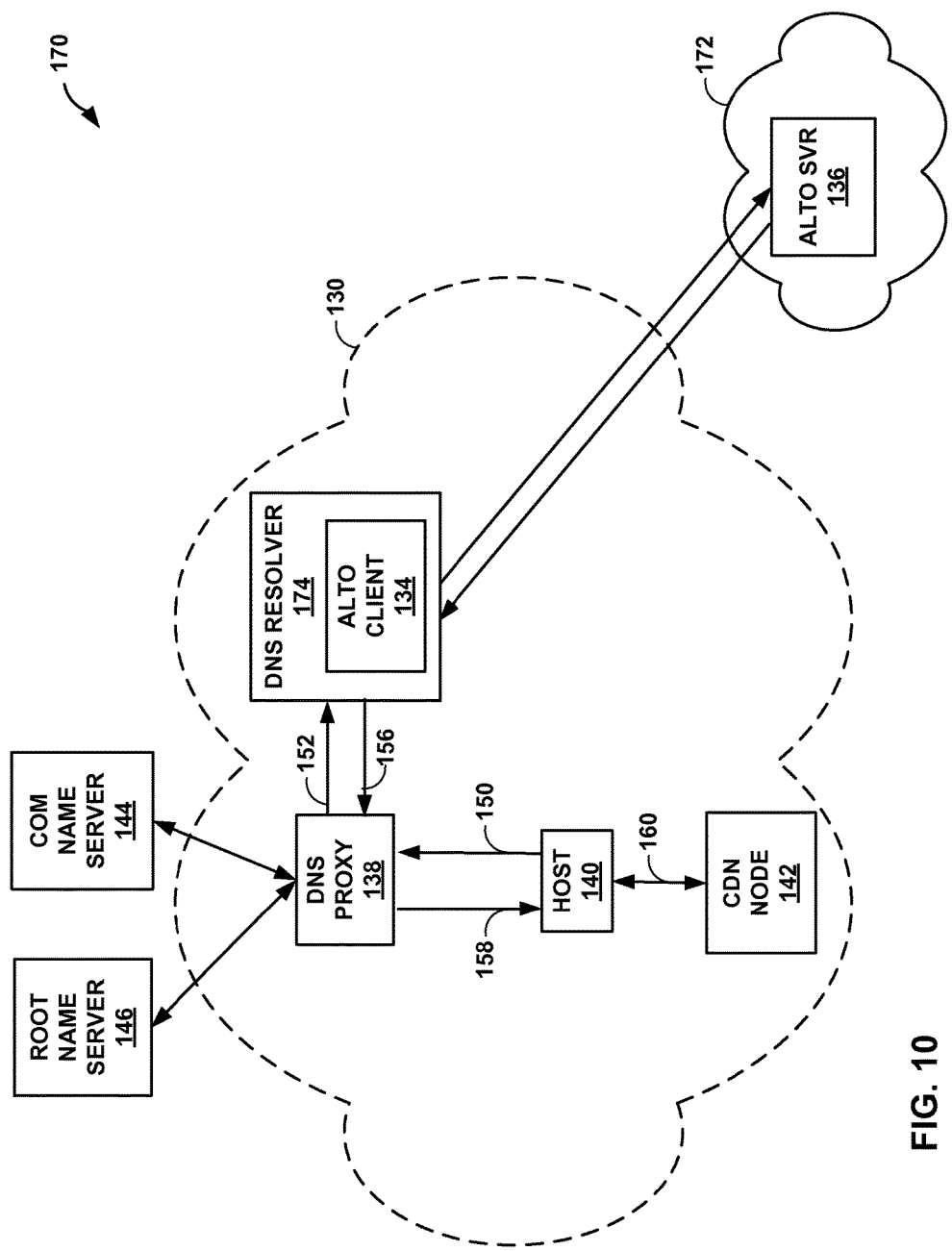
FIG. 10 is a block diagram of an exemplary network system that includes a content delivery network that employs a domain name service (DNS) and performs techniques of this disclosure.

FIG. 10 is block diagram illustrating network system 170, which is substantially similar to network system 128 of FIG. 9. However, unlike network system 128, ALTO server 136 for CDN 130 is under the control of a separate administrative domain in a different network 172. In addition, name server 132 is replaced with DNS resolver 174.

Many organizations/content providers outsource DNS management to external vendors (in the illustrated embodiment, the administrator of network 172) for various reasons like reliability, performance improvement, DNS security, and others. Managed DNS service may be used either with caches within CDN 130 or with other CDNs. DNS resolver 174 load balances traffic dynamically across content servers. Typically, a managed DNS service provider positions DNS resolvers across geographical locations to improve performance. DNS resolver 174 comprises ALTO client 134 to obtain a network map and cost map from ALTO server 136. Using the techniques of this disclosure, DNS resolver 174 may then load balance traffic based on information provided in the network map and cost map. For example, the cost map may incorporate real-time updates from CDN node 142 that cause DNS resolver 174 to increase or decrease an amount of requests redirected to CDN node 142.

In some embodiments, CDN 130 and network 172 are connected to a single service provider network. In such instances, network system 170 operates substantially similarly to network system 128 of FIG. 9. However, in some embodiments, CDN 130 and network 172 are connected to different service provider networks. In such instances, network system 170 operates substantially similarly to network system 2 of FIG. 1, where access network 4 and CDN 6 of network system 2 correspond to network 172 and CDN 130, respectively. In such instances, DNS resolver 174 may connect to an ALTO server that performs to perform the master cost map generation techniques described above with respect to CDN-ALTO server 22 of FIG. 1.

In some embodiments, a managed DNS service may utilize multiple CDN vendors and DNS resolver 174 may redirect requests to different CDN nodes based on a subdomain. For example, DNS resolver 174 may comprise policies that specify redirection to CDN node 142 for a particular subdomain and redirection to another CDN node (not shown) for a different subdomain. In this embodiment, DNS resolver 174 may comprise ALTO client 134.

Figure 11:
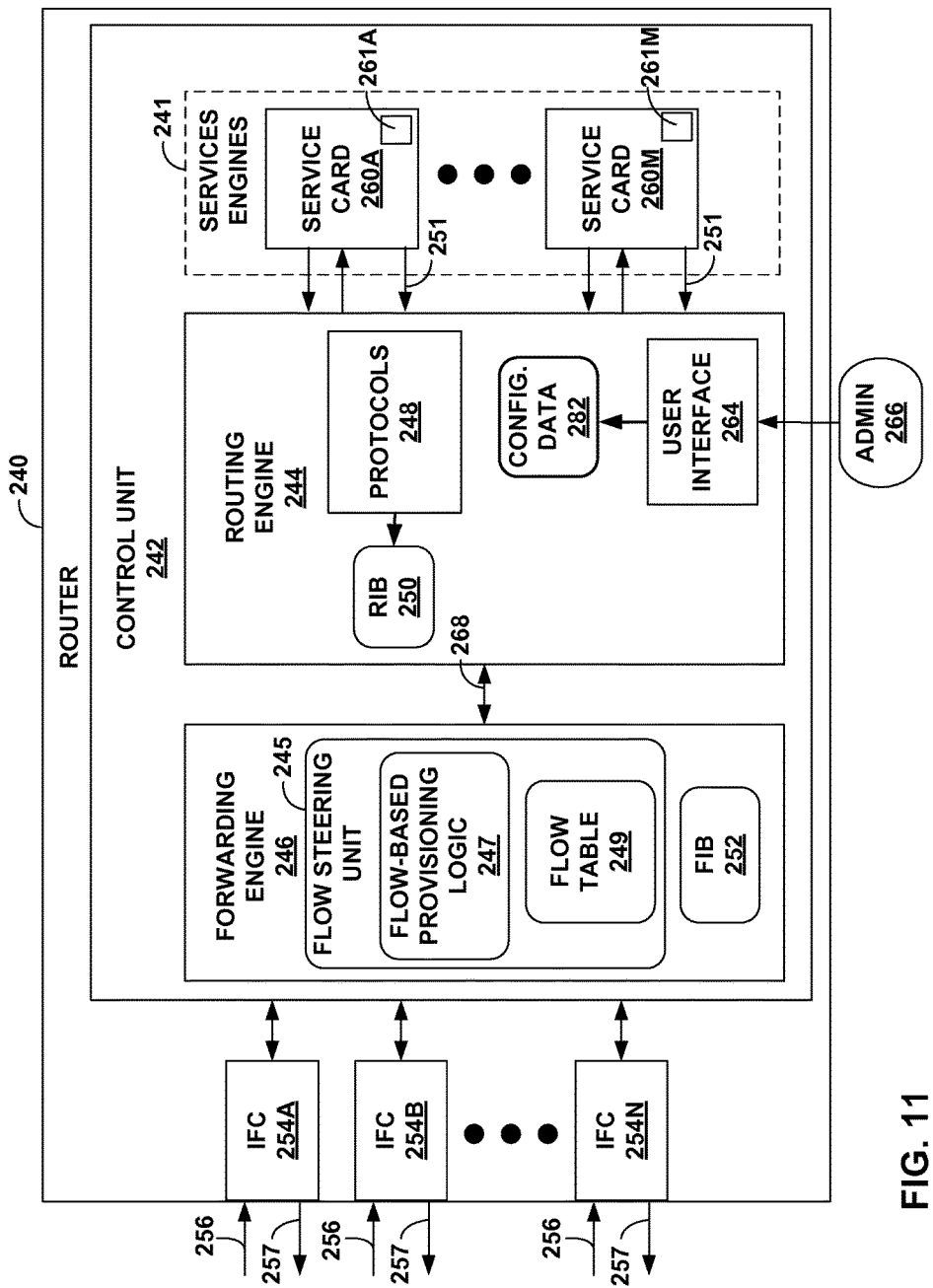
FIG. 11 is a block diagram illustrating example structural components of a router in accordance with the principles of the invention.

FIG. 11 is a block diagram illustrating a router 240 that provides scalable ALTO services in accordance with the principles of the invention. Router 240 may represent any of ALTO-CDN server 22 of FIG. 1, ALTO server 70 of FIG. 5, or ALTO server 80 of FIG. 6, or ALTO server 136 of FIGS. 9-10. Router 240 may include one or more services engines 241, which applies services such as ALTO services as described herein. That is, service engines may provide an operating environment for one or more virtual ALTO servers 261A-261M operating on respective service cards 260A-260M ("service cards 260") for servicing the ALTO protocol. In this example, routing and services are integrated within a single router 240 that uses a shared forwarding engine 246 suitable for high-speed forwarding functions required by routers that process high-volume traffic.

Router 240 comprises a control unit 242 that includes a Routing engine 244 coupled to a forwarding engine 246. Routing engine 244 provides an operating environment for routing protocols 248 that perform routing operations. Routing engine 244 is responsible for the maintenance of a routing information base (RIB) 50 to reflect the current topology of a network and other network entities to which it is connected. In particular, routing engine 244 periodically updates RIB 250 to accurately reflect the topology of the network and other entities. Moreover, routing engine 244 pushes network topology information stored by RIB 50 to service cards 260 to provide topology input to virtual ALTO servers 261. Virtual ALTO server 261 may use this topology input during PID aggregation, network map generation, and cost map generation.

In accordance with RIB 250, forwarding engine 246 maintains forwarding information base (FIB) 52 that associates network destinations with specific next hops and corresponding interface ports. For example, control unit 242 analyzes RIB 250 and generates FIB 52 in accordance with RIB 250. Router 240 includes interface cards 54A-54N ("IFCs 254") that receive and send packets via network links 256 and 257, respectively. IFCs 254 may be coupled to network links 256, 257 via a number of interface ports. Forwarding engine 246 may comprise a switch fabric to forward the multicast packets to the interface cards based on the selected next hops.

Generally, forwarding engine 246 may relay certain packets received from IFCs 254 to service cards 260. Specifically, forwarding engine 246 may include a flow steering unit 245 to selectively direct packets to services engines 241 for processing. That is, flow steering unit 245 receives incoming packet flows and determines whether to send the packets through the services engines 241 for processing within one or more of service cards 260, or whether to bypass the services engines 241. For example, flow steering unit 245 may direct packet flows destined for one of virtual ALTO servers 261 provided by the service cards. An example forwarding plane configuration for separation of services and forwarding in an integrated services router may be found in U.S. patent application Ser. No. 12/235,677, entitled "Forwarding Plane Configuration for Separation of Services and Forwarding in an Integrated Services Router," filed on Sep. 23, 2008, the entire contents of which is incorporated by reference herein.

Service cards 260 receive packets from forwarding engine 246, selectively provide services in accordance with the defined configuration data 282. In some case, service cards may relay the packets or any response packets to control unit 242 for forwarding by forwarding engine 246 in accordance with FIB 252. A number of input and output logical interfaces may couple service cards 260 to control unit 242.

Service cards 260 having services engines 241 may be installed along a backplane or other interconnect of router 240 to perform a variety of services on the packets received from forwarding engine 246 including ALTO services and other services, such as filtering, logging, Intrusion Detection and Prevention (IDP) analysis, virus scanning, deep packet inspection. In some cases, a service card 260 may issue commands 251 to dynamically configure a flow table 249 within flow steering unit 245 of forwarding engine 246. For example, flow steering unit 245 receives a packet and analyzes the received packet to identify a packet flow associated with the packet, e.g., using a flow-based provisioning logic 47 to identify an n-tuple based on information carried in the header or body of the packet (e.g., a five-tuple and an input interface). Upon identifying the packet flow, flow steering unit 245 references an internal flow table 249 to determine whether belongs to a new packet flow or a packet flow already recognized by the router 240.

If flow steering unit 245 does not find a match in the flow table 249, which indicates that the packet belongs to a new packet flow, the flow steering unit 245 directs the packet to service cards 260 of services engines 241 for firewall services. When the packet is directed to services engines 241, one of service cards 260 applies ALTO services to those packets that conform to the ALTO protocol and that are destined for the ALTO services of the router. In addition, the service cards 260 may extract and assemble application layer data from the packet, and a deep packet inspection (DPI) engine may perform Intrusion Detection and Prevention (IDP) analysis and/or virus scanning to filter out bad packets. As a further example, the service card 260 may also perform ciphering, NAT or authentication services.

Upon receiving and processing the packet or packets of a packet flow, service cards 260 may issue a command 51 to install a dynamic filter within the flow table 249, such as an exact match filter that indicates particular actions to be performed when a packet is received that matches the filter. In the case that service cards 260 determine no further firewall services need be applied to a packet flow (e.g., after determining that the packet flow is trusted or benign), service cards 260 may install a filter within flow steering unit 245 to specify that subsequent packets of this packet flow session may be processed on a straight path that bypasses services engines 241. When flow steering unit 245 receives a subsequent packet of the same packet flow, flow steering unit 245 checks the flow table 249, determines that the packet matches the new dynamic filter, and directs the packet on the appropriate path according to the dynamic filter.

Control unit 242 includes a user interface 264 by which a client such as an administrator 266 ("ADMIN 266") can directly or remotely configure router 240. By interacting with user interface 264, various clients, such as human users and automated scripts, can perform various configuration tasks. For example, the clients may configure virtual ALTO servers 260 with provisioning policies, network link transmission cost information, and QoS information. As other examples, the clients may configure interface cards of the router, adjust parameters for the supported network protocols, specify the physical components within the routing device, modify the routing information maintained by the router, access software modules and other resources residing on the router, and the like. For example, user interface 264 may comprise a command line interface (CLI) or other suitable interface (e.g., a web browser-based interface), for processing user or script-driven commands. User interface 264 represents software executing on routing engine 244 that presents a command line interface (e.g., via a shell or Telnet session) for receiving configuration data as described herein, including configuration for the ALTO protocol provided by services engines 241 of service cards 260.

In one embodiment, each of forwarding engine 246 and routing engine 244 may comprise one or more dedicated processors, storage media, hardware, and the like, and may be communicatively coupled by a data communication channel 268. The data communication channel 268 may be a high-speed network connection, bus, shared-memory or other data communication mechanism.

In this way, the operation of router 240 can be viewed as segmented into a control plane, a service plane, and a data plane. The control plane may be seen as provided by routing engine 244 and may include one or more software processes, such as a management daemon and a routing protocol daemon executing on a computing environment provided by one or more microprocessors.

Router 240 may further include a physical chassis (not shown) for housing control unit 242. The chassis has a number of slots (not shown) for receiving a set of cards, including IFCs 254 and service cards 260. Each card may be inserted into a corresponding slot of the chassis for electrically coupling the card to control unit 242 via a bus, backplane, or other electrical communication mechanism.

Router 240 may operate according to executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of router 240 may be implemented by executing the instructions of the computer-readable storage medium with one or more processors, discrete hardware circuitry, firmware, software executing on a programmable processor, or a combination of any of the above.

The techniques described in this disclosure may be implemented, at least in part, in hardware, software, firmware or any combination thereof on the device management system and the managed devices. For example, various aspects of the described techniques may be implemented as encoded program code executed by one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a tangible computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

What is claimed is:

1. A method comprising:
   obtaining, by an application-layer traffic optimization (ALTO) server, a first provider-defined identifier (PID)-type attribute that identifies an endpoint type for a first endpoint;
   obtaining, by the ALTO server, a second PID-type attribute that identifies an endpoint type for a third endpoint;
   generating, by the ALTO server, an ALTO network map that includes a first PID, a second PID, and a third PID, wherein the first PID specifies the first endpoint and includes a PID-type field that specifies the first PID-type attribute, wherein the second PID specifies a second endpoint, and wherein the third PID specifies the third endpoint and includes a PID-type field that specifies the second PID-type attribute;
   determining, by the ALTO server based on the first PID-type attribute specified by the first PID, a first provider-defined cost to exchange content between the first endpoint of the first PID and the second endpoint specified by the second PID;

determining, by the ALTO server based on the second PID-type attribute specified by the third PID, a second provider-defined cost to exchange content between the third endpoint specified by the third PID and the second endpoint specified by the second PID, wherein the second provider-defined cost is greater than the first provider-defined cost; and outputting, by the ALTO server, an indication of the first provider-defined cost and an indication of the second provider-defined cost.

2. The method of claim 1, wherein the first PID-type attribute identifies the endpoint type for the first endpoint as one of a consumer of a content delivery service and a provider of the content delivery service.

3. The method of claim 1, wherein the first PID-type attribute identifies the endpoint type for the first endpoint as a border router for an autonomous system.

4. The method of claim 1, wherein the first PID-type attribute is associated with a service classification corresponding to a service-level agreement between a customer associated with the first endpoint and a service provider that administers the ALTO server.

5. The method of claim 1, further comprising:
selecting, by the ALTO server based on the first provider-defined cost, the first endpoint specified by the first PID to exchange content with the second endpoint of the second PID,
wherein outputting the indication of the first provider-defined cost comprises outputting, by the ALTO server, an identifier for the selected endpoint.

6. The method of claim 1, further comprising:
generating, by the ALTO server, an ALTO cost map that includes a cost entry that specifies the first PID, the second PID, and the first provider-defined cost,
wherein outputting the indication of the first provider-defined cost comprises sending, by ALTO server to an ALTO client, the ALTO cost map.

7. The method of claim 1,
wherein outputting the indication of the first provider-defined cost comprises outputting, by ALTO server in response to determining the first PID-type attribute and the second PID-type attribute are the same PID-type attribute, the indication of the first provider-defined cost to prevent the exchange of content between the first endpoint of the first PID and the second endpoint specified by the second PID.

8. A non-transitory computer-readable medium comprising instructions for causing at least one programmable processor of an application-layer traffic optimization (ALTO) server to:
obtain a first provider-defined identifier (PID)-type attribute that identifies an endpoint type for a first endpoint;
obtain, by the ALTO server, a second PID-type attribute that identifies an endpoint type for a third endpoint;
generate an ALTO network map that includes a first PID, a second PID, and a third PID, wherein the first PID specifies the first endpoint and includes a PID-type field that specifies the first PID-type attribute, and wherein the second PID specifies a second endpoint, and wherein the third PID specifies the third endpoint and includes a PID-type field that specifies the second PID-type attribute;
determine, based on the first PID-type attribute specified by the first PID, a first provider-defined cost to exchange content between the first endpoint of the first PID and the second endpoint specified by the second PID;
determine, based on the second PID-type attribute specified by the third PID, a second provider-defined cost to exchange content between the third endpoint specified by the third PID and the second endpoint specified by the second PID, wherein the second provider-defined cost is greater than the first provider-defined cost; and
output an indication of the first provider-defined cost and an indication of the second provider-defined cost.

9. A computing device comprising:
a memory to store an application-layer traffic optimization (ALTO) network map;
at least one programmable processor coupled to the memory;
a network map module operable by the at least one programmable processor to obtain a first provider-defined identifier (PID)-type attribute that identifies an endpoint type for a first endpoint,
wherein the network map module is further operable by the at least one programmable processor to generate the ALTO network map to include a first PID, a second PID, and a third PID,
wherein the first PID specifies the first endpoint and includes a PID-type field that specifies the first PID-type attribute, wherein the second PID specifies a second endpoint, and wherein the third PID specifies the third endpoint and includes a PID-type field that specifies the second PID-type attribute; and
a client interface operable by the at least one programmable processor to determine, based on the first PID-type attribute specified by the first PID, a first provider-defined cost to exchange content between the first endpoint of the first PID and the second endpoint specified by the second PID,
wherein the client interface is further operable by the at least one programmable processor to determine, based on the second PID-type attribute specified by the third PID, a second provider-defined cost to exchange content between the third endpoint specified by the third PID and the second endpoint specified by the second PID, wherein the second provider-defined cost is greater than the first provider-defined cost, and
wherein the client interface is further operable by the at least one programmable processor to output an indication of the first provider-defined cost and an indication of the second provider-defined cost.

10. The computing device of claim 9, wherein the first PID-type attribute identifies the endpoint type for the first endpoint as one of a consumer of a content delivery service and a provider of the content delivery service.

11. The computing device of claim 9, wherein the first PID-type attribute identifies the endpoint type for the first endpoint as a border router for an autonomous system.

12. The computing device of claim 9, wherein the first PID-type attribute is associated with a service classification corresponding to a service-level agreement between a customer associated with the first endpoint and a service provider that administers the ALTO server.

13. The computing device of claim 9,
wherein the client interface is further operable by the at least one programmable processor to select, based on the first provider-defined cost, the first endpoint specified by the first PID to exchange content with the second endpoint of the second PID, wherein to output the indication of the first provider-defined cost the client interface is further operable by the at least one programmable processor to output an identifier for the selected endpoint.

14. The computing device of claim 9, further comprising:
a cost map module operable by the at least one programmable processor to generate an ALTO cost map that includes a cost entry that specifies the first PID, the second PID, and the first provider-defined cost,
wherein to output the indication of the first provider-defined cost the client interface is further operable by the at least one programmable processor to send, to an ALTO client, the ALTO cost map.

15. A system comprising:
a computing device configured to operate as a redirector to receive a content request from a second endpoint; and
an application-layer traffic optimization (ALTO) server configured to:
obtain a first provider-defined identifier (PID)-type attribute that identifies an endpoint type for a first endpoint;
obtain, by the ALTO server, a second PID-type attribute that identifies an endpoint type for a third endpoint;
generate an ALTO network map that includes a first PID a second PID, and a third PID, wherein the first PID specifies the first endpoint and includes a PID-type field that specifies the PID-type attribute, and wherein the second PID specifies a second endpoint, and wherein the third PID specifies the third endpoint and includes a PID-type field that specifies the second PID-type attribute;
determine, based on the PID-type attribute specified by the first PID, a provider-defined cost to exchange content between the first endpoint of the first PID and the second endpoint specified by the second PID;
determine, based on the second PID-type attribute specified by the third PID, a second provider-defined cost to exchange content between the third endpoint specified by the third PID and the second endpoint specified by the second PID, wherein the second provider-defined cost is greater than the first provider-defined cost; and
output an indication of the first provider-defined cost and an indication of the second provider-defined cost to the computing device.

16. The system of claim 15,
wherein the indication of the first provider-defined cost comprises an identifier for the first endpoint, and
wherein the computing device is configured to send, to the second endpoint in response to receiving the indication of the first provider-defined cost, a content response that includes the identifier for the first endpoint.

17. The system of claim 15,
wherein the computing device is a name server, and
wherein the content request is a domain name service (DNS) request.

18. The system of claim 15,
wherein the ALTO server is further configured to generate an ALTO cost map that includes a cost entry that specifies the first PID, the second PID, and the first provider-defined cost,
wherein to output the indication of the first provider-defined cost the ALTO server is further configured to send, to the computing device, the ALTO cost map,
wherein the computing device is further configured to, in response to receiving the content request and based on the ALTO cost map, select the first endpoint and send, to the second endpoint, a content response that includes the identifier for the first endpoint.

* * * * *